(12) United States Patent
Kraemer et al.

(10) Patent No.: US 8,165,740 B2
(45) Date of Patent: Apr. 24, 2012

(54) METHOD AND DEVICE FOR BIDIRECTIONAL SINGLE-WIRE DATA TRANSMISSION

(75) Inventors: Rolf Kraemer, Schwieberdingen (DE); Ulrich Bentel, Wiernsheim (DE); Bernhard Eisele, Rangendingen (DE); Markus Ketterer, Stuttgart (DE); Uwe Schiller, Sersheim (DE); Juergen Stein, Illingen (DE)

(73) Assignee: Robert Bosch GmbH, Stuttgart (DE)

( * ) Notice: Subject to any disclaimer, the term of this patent is extended or adjusted under 35 U.S.C. 154(b) by 1173 days.

(21) Appl. No.: 10/566,916

(22) PCT Filed: Jul. 1, 2004

(86) PCT No.: PCT/DE2004/001388
§ 371 (c)(1),
(2), (4) Date: Apr. 24, 2008

(87) PCT Pub. No.: WO2005/015816
PCT Pub. Date: Feb. 17, 2005

(65) Prior Publication Data
US 2008/0217076 A1    Sep. 11, 2008

(30) Foreign Application Priority Data
Aug. 6, 2003 (DE) .................. 103 35 905

(51) Int. Cl.
*H04L 5/14* (2006.01)
(52) U.S. Cl. ............ 701/29; 701/36; 307/125; 370/318
(58) Field of Classification Search .............. 701/29–36; 370/318, 320, 321, 260, 351, 436, 463; 307/125, 307/130, 131
See application file for complete search history.

(56) References Cited

U.S. PATENT DOCUMENTS

| 6,006,143 | A | 12/1999 | Bartel et al. | |
|---|---|---|---|---|
| 7,830,858 | B2 * | 11/2010 | Binder | 370/351 |
| 7,835,386 | B2 * | 11/2010 | Binder | 370/463 |

FOREIGN PATENT DOCUMENTS

| DE | 35 19 709 | 12/1985 |
|---|---|---|
| DE | 39 03 377 | 8/1990 |
| DE | 199 50 655 | 5/2001 |
| EP | 0406718 | 1/1991 |
| JP | 56104561 | 8/1981 |

* cited by examiner

*Primary Examiner* — Richard M. Camby
(74) *Attorney, Agent, or Firm* — Kenyon & Kenyon LLP

(57) ABSTRACT

A device and a method for bidirectional single-wire data transmission of data information between an electronic control unit and at least one peripheral unit. A predefined constant voltage and/or a predefined constant current is applied to a driver device of the electronic control unit to produce voltage-coded and/or current-coded information. The voltage-coded and/or current-coded information is transmitted from the driver device of the electronic control unit to a driver device 30 of the peripheral unit via a single-wire line. At least the driver logic of the driver device and/or the communication logic of the peripheral unit are triggered and powered through the current flow. Information occurring on the peripheral unit is current-coded and/or voltage coded due to the triggering thereof. The current-coded and/or voltage-coded information are uploaded from the driver device of the peripheral unit to the driver device of the electronic control unit during the triggering of the peripheral unit via the same single-wire line.

21 Claims, 3 Drawing Sheets

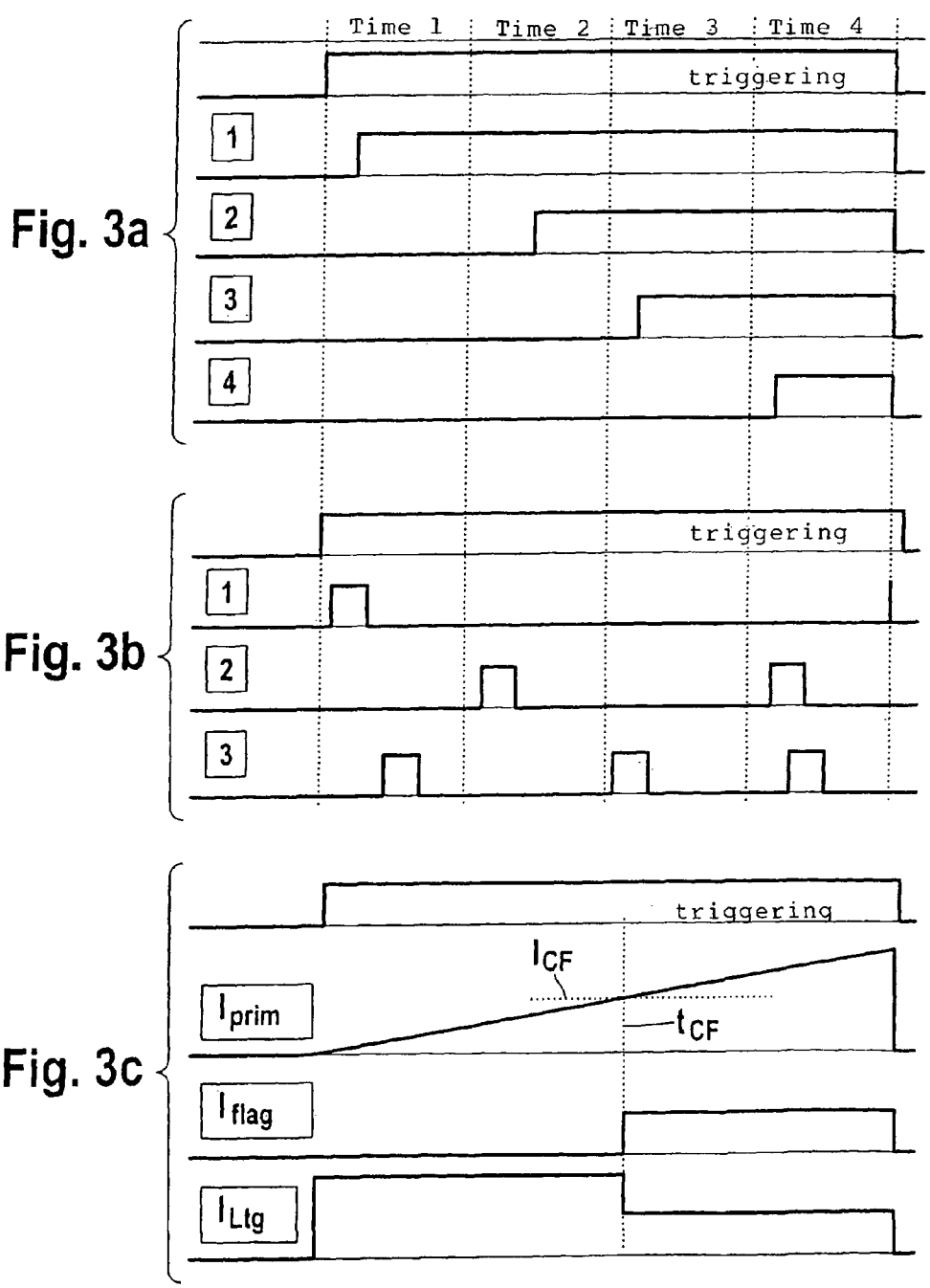

METHOD AND DEVICE FOR BIDIRECTIONAL SINGLE-WIRE DATA TRANSMISSION

FIELD OF THE INVENTION

The present invention relates to method and a device for bidirectional single-wire data transmission of data information between an electronic control unit and at least one peripheral unit, whose electronics are powered by the triggering signal.

BACKGROUND INFORMATION

Although it is applicable to any arbitrary systems which include a control unit and at least one peripheral unit connected thereto using a line, the present invention is explained below in relation to an ignition system for gasoline engines in the field of motor vehicles, for example.

In current motor vehicle technology, systems are used in which peripheral units are connected via lines to a control unit. In this case, the corresponding peripheral units are usually spatially separated from the control unit, because of which special requirements are to be placed on the lines and the interfaces.

Some interfaces and/or bus systems for motor vehicle applications are conventional, such as the CAN bus system. These bus systems are not suitable for real-time systems, however, i.e., for immediate triggering of a procedure a few µs after receiving information, but rather solely for non-time-critical data exchange of spatially distributed systems.

Further systems have the disadvantage that they are not implemented as sufficiently fail-safe, in particular over long line distances.

SUMMARY

A method and device according to an example embodiment of the present invention may have the advantage in relation to the conventional approaches that a fail-safe interface having only one line between the electronic control unit and the peripheral unit, such as an ignition coil or a fuel injector of a motor vehicle engine, is provided, the interface having real-time capability for the existing chronological conditions, as they exist in ignition systems or injection systems in motor vehicles, for example.

In accordance with the present invention, by applying a predefined constant voltage (and/or a predefined constant current) to the output of a driver device of the electronic control unit, voltage-coded (and/or current-coded) information is produced, this voltage-coded (and/or current-coded) information being transmitted from the driver device of the control unit to a driver device of the peripheral unit via a single-wire line, the peripheral unit being triggered by the triggering signal and being supplied with power during the triggering and, after the beginning of the triggering of the peripheral unit, information occurring thereon being current-coded (and/or voltage-coded), the current-coded (and/or voltage-coded) information being retransmitted from the driver device of the peripheral unit to the driver device of the electronic control unit during the triggering of the peripheral unit, the same single-wire line being used as for the transmission of the voltage-coded (and/or current-coded) triggering information.

Therefore, a bidirectional single-wire interface is provided, in which the peripheral unit is supplied by the information-transmitting triggering signal with the component of power which is required at least for the low-power components of the electronics, specifically the driver device and the information-processing electronics of the peripheral unit, including the communication logic and/or the triggering signals of the power electronics. Therefore, independence of the low-power component of the electronics of the peripheral unit from a possibly existing power module of the peripheral unit is provided. If the peripheral unit has power electronics of a type such that the triggering energy is sufficient for operating and/or triggering the power module, there is even complete independence from a vehicle electrical system of the system, which otherwise typically provides the required energy for activating the power electronics.

Since both 12 volt and also 42 volt vehicle electrical systems will be used in the future automobile field, this independence of the low-power component of the electronics from the power module of the peripheral unit is advantageous for universal usability of the peripheral unit and the driver device in the control unit. Therefore, fuse protection measures independent from the vehicle electrical system need only be provided once in the electronic control unit and not with each individual peripheral unit. Therefore, no vehicle electrical system filtering is necessary for the low-power part in the peripheral unit.

Furthermore, the device and/or the method according to the example embodiment of the present invention includes an interface which may upload information to the electronic control unit during the triggering of the peripheral unit. Because of the power supply of the peripheral unit by the triggering signal, a system which is extremely fail-safe to unintentionally being turned on is provided.

According to an example refinement, the voltage-coded (and/or current-coded) triggering of the peripheral unit is implemented as a binary signal and the current-coded (and/or voltage-coded) upload is implemented as an analog signal.

According to a further example refinement, both the voltage-coded (and/or current-coded) triggering and also the current-coded (and/or voltage-coded) upload are implemented as binary signals.

According to a further example refinement, the information to be uploaded from the peripheral unit to the electronic control unit is implemented as a diagnostic signal for diagnosis of the peripheral unit. Therefore, the control unit may perform an analysis of the status of the peripheral unit using the uploaded information.

According to a further example refinement, the information to be uploaded from the peripheral unit to the electronic control unit is implemented as a control signal for the further, i.e., subsequent control of the peripheral unit. Therefore, the electronic control unit may control the assigned peripheral unit in a way tailored to the current status of the system.

According to a further example refinement, the information to be transmitted is voltage-coded and/or current-coded in such a way that the duration until a signal edge change of the voltage and/or the current represents the characteristic variable of the information.

According to a further example refinement, the electronic control unit is implemented as an engine control unit. Other implementations are also possible.

According to a further example refinement, the peripheral unit is implemented as an ignition coil, a fuel injector of a motor vehicle engine, or the like.

BRIEF DESCRIPTION OF THE DRAWINGS

Exemplary embodiments of the present invention are illustrated in the figures and explained in greater detail below.

FIG. 3a shows a schematic illustration of a timing diagram during the data transmission according to a first exemplary embodiment of the present invention, the time range of a state change being detected.

FIG. 3b shows a schematic illustration of a timing diagram during the data transmission according to a second exemplary embodiment of the present invention, a bit being assigned to each time range.

FIG. 3c shows a schematic illustration of a timing diagram during the data transmission according to a third exemplary embodiment of the present invention on the basis of the example of primary current monitoring.

DESCRIPTION OF EXAMPLE EMBODIMENTS

Figure 1:
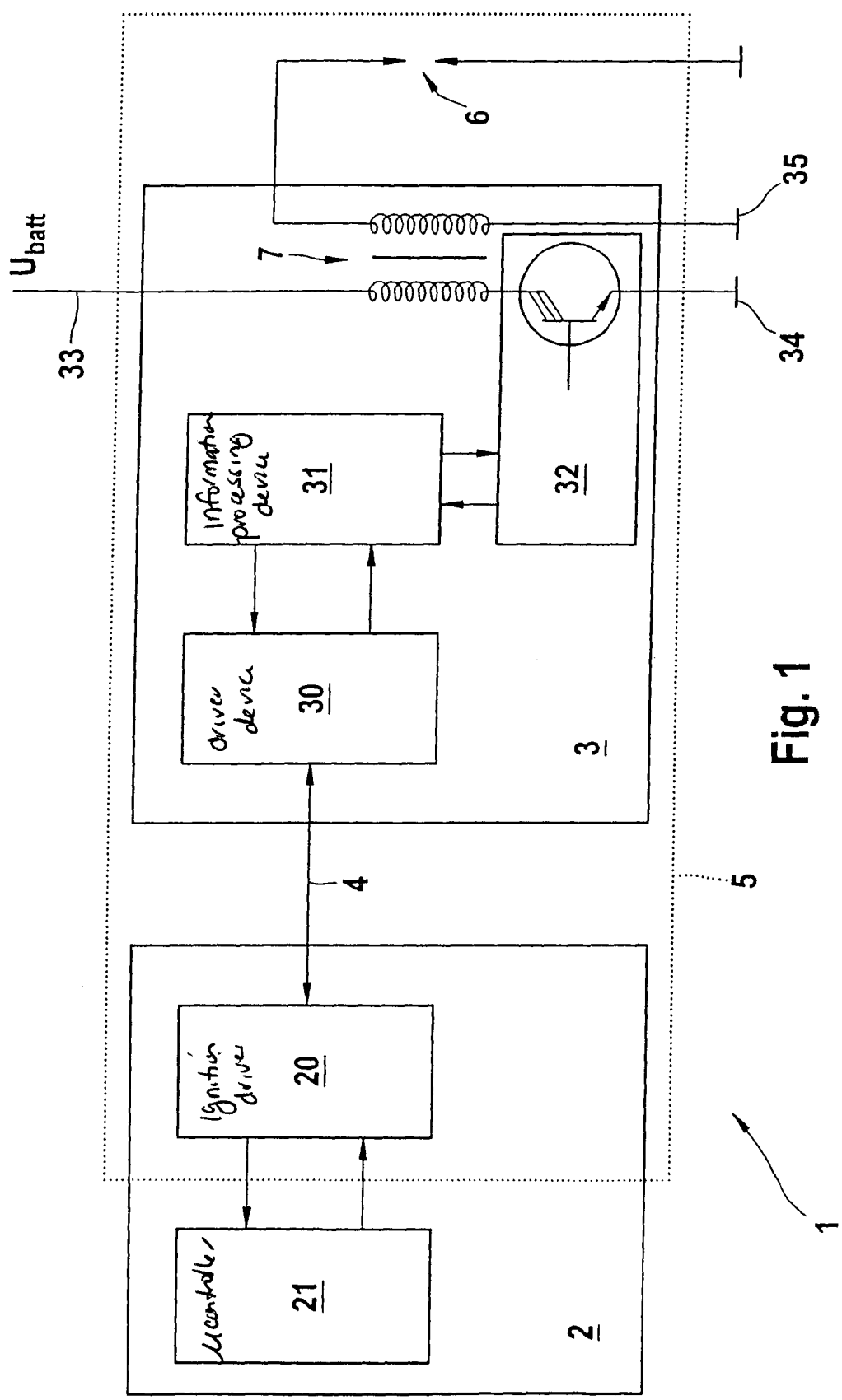
FIG. 1 shows a schematic illustration of a device 1 according to an example embodiment of the present invention including an electronic control unit 2 and a peripheral unit 3 connected thereto via a single-wire line 4.

Identical reference numerals identify identical or functionally identical components in the figures.

FIG. 1 shows a schematic illustration of a device 1 for bidirectional transmission of data information via a single-wire line 4 between an electronic control unit 2 and a peripheral unit 3 having an ignition coil 7, a fuel injector of a motor vehicle engine, a sensor, or the like, for example.

In the following, the device is explained with reference to FIG. 1 as an example in regard to an ignition system 5 of a motor vehicle engine. Ignition system 5 includes, for example, an ignition coil 7, power electronics 32 for triggering, having a logic and a required ignition output stage, for example, an information processing device 31, a driver device 30, which is connected via single-wire line 4 to an ignition driver 20 in an engine control unit 2 having a microcontroller 21.

Information for turning on peripheral unit 3 and/or ignition coil 7 is transmitted from the electronic control unit, i.e., engine control unit 2.

Power electronics 32 of peripheral unit 2 may, according to the present exemplary embodiment, be connected to an external battery voltage 33, preferably via ignition coil 7, the power circuit being closed via a vehicle body ground 34.

According to the exemplary embodiment of the present invention, the electronics of peripheral unit 3 are supplied with power from the triggering by control unit 2, the electronics of peripheral unit 3 also being able to trigger power electronics 32 using this power. It is noted here that power electronics 32 may also be decoupled from information processing device 31 and triggered directly by single-wire interface 4.

Power is stored in magnetic form in ignition coil 7 through the current flowing during the triggering in the primary winding of ignition coil 7. Information about this operation may be uploaded immediately during the triggering of peripheral unit 3 to electronic control unit 2 via bidirectional single-wire interface 4. In this case, information for diagnosis of the peripheral unit and/or ignition coil 7, information for regulation and/or control of ignition coil 7, or similar information may be uploaded to electronic control unit 2.

If sufficient power has been stored in ignition coil 7 and the desired moment of ignition has been reached, triggering of ignition coil 7 is ended, power electronics 32 of peripheral unit 3 being turned off because a triggering current flow and/or a triggering voltage is no longer present. The power transistor interrupts the current flow in the primary side, a current flow arising in the secondary side of the ignition coil because of the induction and, as a result, an ignition spark arising.

Figure 2:
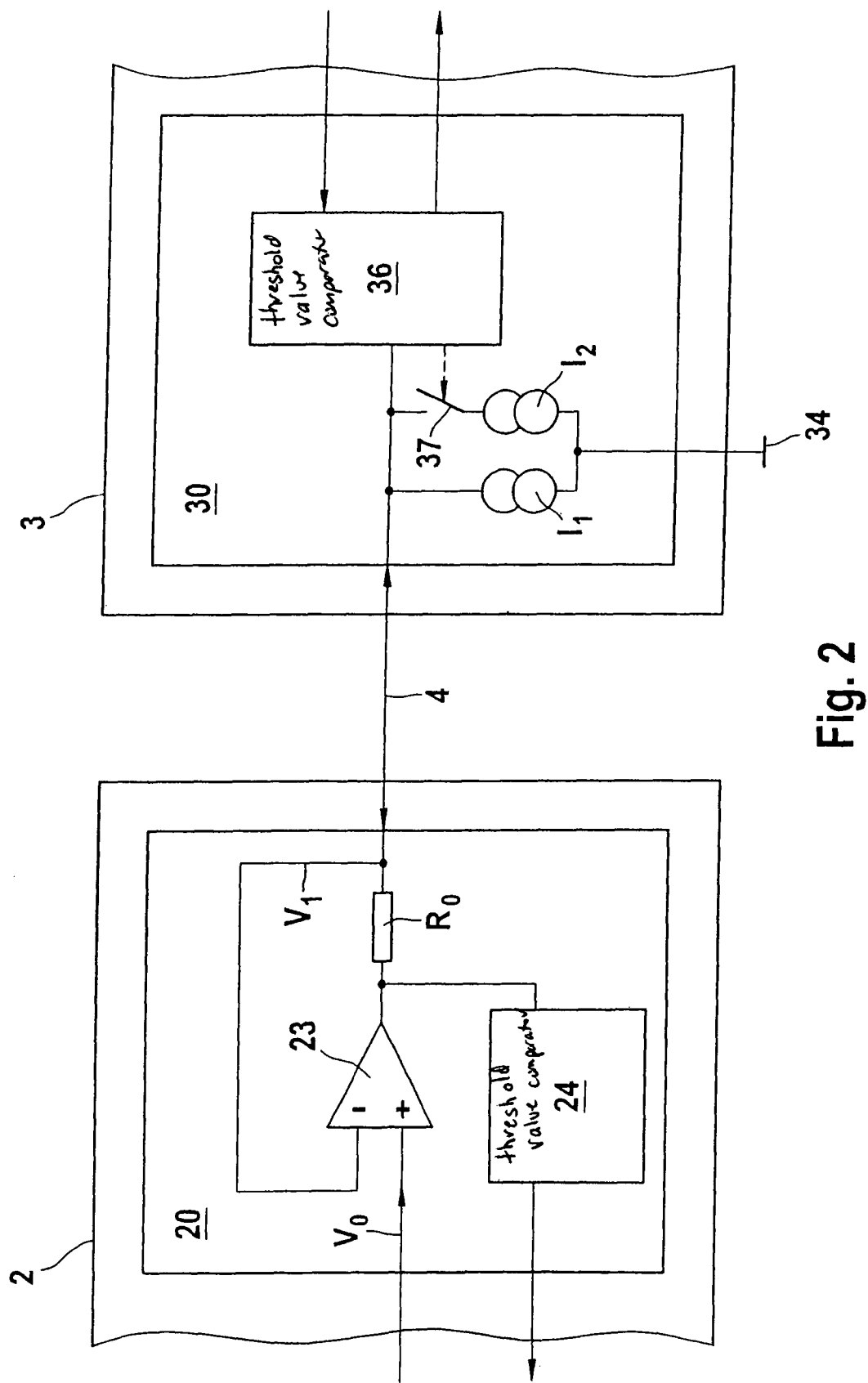
FIG. 2 shows a schematic illustration of the circuit design of driver devices 20 and 30 of electronic control unit 2 and peripheral unit 3 according to an exemplary embodiment of the present invention.

In the following, the method according to the present invention for bidirectional single-wire data transmission is explained in greater detail with reference to FIG. 2. Driver device 20 of electronic control unit 2 is connected to a microcontroller 21 (see FIG. 1), as already explained above. Furthermore, driver device 20 of electronic control unit 2 of the embodiment of the device shown has an operational amplifier 23, for example, which is connected as an isolation amplifier in such a way that the same voltage is always applied to voltage node V1 as to voltage node V0, the isolation amplifier preferably being combined with other electronic circuits in a separate circuit.

Furthermore, provided in driver device 20 is a threshold value comparator 24 having an assigned logic device for sensing a change in driver device 30 of peripheral unit 3, as will be described in greater detail later. Driver device 20 of electronic control unit 2 is connected via single-wire line 4 to driver device 30 of peripheral unit 3 for unidirectional conduction of a current flow and bidirectional transmission of information.

According to an exemplary embodiment of the present invention, driver device 30 also includes a threshold value comparator in logic 36. Furthermore, driver device 30 includes a current sink system, which includes a first current sink $I_1$ and a second current sink $I_2$, connected parallel thereto, according to the present exemplary embodiment, for example. Binary current coding of the information to be uploaded from peripheral unit 3 to electronic control unit 2 is performed via current sinks $I_1$ and $I_2$.

In operation, information transmission from electronic control unit 2 to peripheral unit 3 is triggered by a computer program of microcontroller 21 (see FIG. 1). The information to be transmitted is preferably transmitted in the form of a voltage change and/or level change to driver device 30 of electronic control unit 2 via a port of microcontroller 21. Driver device 21 sets a generally constant voltage, such as 5 volts, at its output V1. According to the exemplary embodiment of the present invention, operational amplifier 23 of electronic control unit 2 is preferably connected as an isolation amplifier in driver device 20 in such a way that the same constant voltage is always applied to voltage node V1 as to voltage node V0, as already explained above. Furthermore, fractions or multiples of a fixed voltage may be used as a reference. Slight voltage oscillations may be neglected in this case. Alternatively, a low-ohmic through connection may be produced to a constant voltage source via R0. Peripheral unit 3 detects this voltage using threshold value comparator 36, and/or by activating an input stage as a function of a response threshold.

The current flow generated by applying the constant voltage flows via single-wire line 4 from electronic control unit 2 to peripheral unit 3, the electronics of peripheral unit 3 being supplied with energy and therefore being able to operate. Without application of the constant voltage, there is no current flow in the system, because of which the electronics of peripheral unit 3 are in an off state. Power for beginning operation is solely provided simultaneously by the triggering. The system is thus independent from a battery voltage, because of which the system is universally usable at different vehicle electrical system voltages. In addition, the security against undesired turning on is increased.

The triggering current is closed via a vehicle body ground 34, which is connected to the system that includes current sinks $I_1$ and $I_2$.

The information produced in peripheral unit 3 because of its triggering is preferably binary or analog current-coded via an appropriate circuit of current sinks $I_1$ and $I_2$ in driver device 30 of peripheral unit 3 and uploaded to control unit 2 via same single-wire line 4. For this purpose, the logic device of peripheral unit 3 changes its current absorption in a binary and/or analog way, which is described in greater detail with reference to FIG. 3 below.

The relationship of current sinks $I_1$ and $I_2$ of driver device 30 of peripheral device 3 is a function of the required susceptibility and the possible circuitry of driver device 20 of electronic control unit 2. According to the exemplary embodiment of the present invention, current sink $I_2$ is preferably connected parallel to current sink $I_1$, logic 36 sensing whether a value characteristic for a specific event has been reached in the power electronics, for example. The circuit illustrated in FIG. 2 is, of course, only a schematic illustration of the evaluation and preparation of an event in the electronics. Other system changes are possible here for an evaluation and preparation of a current change on the single-wire interface.

As described above, upon sensing an event via the current change using the opening of switch 37, the information to be transmitted from peripheral unit 3 to electronic control unit 2 is binary current-coded and transmitted from driver device 30 of peripheral unit 3 via single-wire line 4 to driver device 20 of electronic control unit 2. The interface current may in turn be measured in driver device 20 with the aid of a resistor $R_0$. The occurring voltage change may be assigned to a binary state, i.e., 0 or 1, via threshold value comparator 24 of electronic control unit 2. Driver device 20 then preferably conducts the received information via a further line to microcontroller 21 of electronic control unit 2.

The extensive independence of voltage and current is advantageously exploited in the present invention to be able to upload the information occurring in peripheral unit 3 to electronic control unit 2.

Electronic control unit 2 may interpret the uploaded information in different ways as a function of the particular area of application, adaptation of the software to the corresponding interpretation being possible. However, this has no influence on the interface system according to the present invention.

The protocol for the information transmission may be implemented freely, for example, only the appearance instant of a state change may be detected, as illustrated in FIG. 3a on the basis of a timing diagram according to an exemplary embodiment of the present invention. In FIG. 3a, the time is plotted-in the x direction and the height, i.e., the value of the signal flank, is plotted in the y direction. As described above, the signal may be interpreted freely, both the quantification and also the value range being able to be tailored to the corresponding area of application.

As is shown in FIG. 3a for four different examples, the coding of the binary states may be defined by a rising and/or falling signal flank, which must then be detected in a specific time slot (time1 through time4), for example. For this purpose, the appearance instant of the state change is decisive, for example, from state 0 to state 1 or vice versa, the vertical solid lines defining the time slots.

FIG. 3b schematically shows three examples of a timing diagram according to a further exemplary embodiment of the present invention. For this purpose, the data is transmitted as bits assigned to the time slots, the number of bits not being fixed, but rather being able to be adapted to the corresponding requirements. In this case, the appearance instant of the state change from 0 to 1 or vice versa within a specific time slot is again preferably selected as the coding.

FIG. 3c schematically shows a timing diagram according to a further exemplary embodiment of the present invention for the example of an ignition coil in the peripheral unit. For this purpose, the rise of primary current $I_{prim}$ of the ignition coil is monitored by uploading time $t_{CF}$ until a predefined value $I_{CF}$ is exceeded. This may be performed, for example, during voltage triggering by lowering current $I_{Ltg}$ of the single-wire line upon appearance of the event.

The signals shown in FIGS. 3a through 3c are not illustrated in their physical form, but rather only as examples for the logical connections.

Therefore, a method and a device are provided, using which an event may be transmitted from a peripheral unit to the control unit via the single-wire line which ensures the triggering of the peripheral unit such that the triggering current is manipulated via switchable current sources and/or sinks in such a way that the control unit may detect and evaluate a change in the system, i.e., the event. The information uploaded to the control unit may be prepared for diagnosis or regulation purposes.

Although the present invention is described above based on preferred exemplary embodiments, it is not restricted thereto, but rather may be modified in many ways.

In particular, the device and/or the method according to the present invention may also be implemented through a current-coded triggering and a voltage-coded upload, i.e., in a way reversed from the exemplary embodiments explained in detail above. For this purpose, the activation is implemented using a fixed current at the output of driver device 20 of electronic control unit 2, peripheral unit 3 answering using a variable voltage as a result. The electronics of peripheral unit 3 also then only operate here when they are supplied with power by the triggering. Driver device 20 of electronic control unit 2 is implemented for this purpose as an ideal current source instead of as an ideal voltage source. The voltage source system of driver device 30 of peripheral unit 3 is implemented in such a way that upon a voltage upload, the overall resistance is changed in such a way that at a constant current, the particular applied voltage varies, i.e., voltage-coded information is uploaded.

What is claimed is:

1. A method for bidirectional single-wire data transmission of data information between an electronic control unit and at least one peripheral unit, comprising:
    applying a predefined constant voltage to a driver device of the electronic control unit to produce voltage-coded information;
    transmitting the voltage-coded information from the driver device of the electronic control unit to a driver device of the peripheral unit via a single-wire line;
    triggering and powering at least one of: i) driver logic of the driver device, and ii) a communication logic of the peripheral unit through a current flow generated by the applied voltage, current-coding information occurring on the peripheral unit due to the triggering thereof; and
    uploading the current-coded information from the driver device of the peripheral unit to the driver device of the electronic control unit via the single-wire line during the triggering of the peripheral unit.

2. The method as recited in claim 1, wherein the voltage-coded information is implemented as a binary signal and the current-coded upload from the peripheral unit to the electronic control unit is implemented as an analog signal.

3. The method as recited in claim 1, wherein the voltage-coded and the current-coded upload from the peripheral unit to the electronic control unit are implemented as binary signals.

4. A method for bidirectional single-wire data transmission of data information between an electronic control unit and at least one peripheral unit, comprising:
- applying a predefined constant current to a driver device of the electronic control unit to produce current-coded information;
- transmitting the current-coded information from the driver device of the electronic control unit to a driver device of the peripheral unit via a single-wire line;
- triggering and powering at least a driver logic of the driver device and a communication logic of the peripheral unit by a current flow generated by the applied current;
- voltage-coding information occurring on the peripheral unit due to the triggering thereof; and
- uploading the voltage-coded information from the driver device of the peripheral unit to the driver device of the electronic control unit via the single-wire line during the triggering of the peripheral unit.

5. The method as recited in claim 4, wherein the current-coded information is implemented as a binary signal and the voltage-coded upload from the peripheral unit to the electronic control unit is implemented as an analog signal.

6. The method as recited in claim 4, wherein the current-coded triggering of the peripheral unit and the voltage-coded upload from the peripheral unit to the electronic control unit are implemented as binary signals.

7. The method as recited in claim 4, wherein the information to be uploaded from the peripheral unit to the electronic control unit is implemented as a diagnostic signal for diagnosis of the peripheral unit.

8. The method as recited claim 4, wherein the information to be uploaded from the peripheral unit to the electronic control unit is implemented as an information signal for further control of the peripheral unit.

9. The method as recited in claim 4, wherein the information to be uploaded is coded in such a way that a duration until a signal edge change of voltage represents a characteristic variable of the information.

10. The method as recited in claim 4, wherein the information to be uploaded is coded in such a way that a state or signal edge change within a time slot represents a characteristic variable of the information and is interpreted as a bit.

11. A device for bidirectional single-wire transmission of data information between an electronic control unit and at least one peripheral unit comprising:
- a first circuit arrangement configured to produce and transmit voltage-coded information from a driver device of the electronic control unit to a driver device of the peripheral unit via a single-wire line and to trigger and power, simultaneously thereto, at least driver logic of the driver device and communication logic of the peripheral unit; and
- a second circuit arrangement configured to upload current-coded information of the driver device of the peripheral unit to the driver device of the electronic control unit via the single-wire line during the triggering of the peripheral unit.

12. A device for bidirectional single-wire transmission of data information between an electronic control unit and at least one peripheral unit, comprising:
- a first circuit arrangement configured to produce and transmit current-coded information from a driver device of the electronic control unit to a driver device of the peripheral unit via a single-wire line and to trigger and power, simultaneously thereto, at least driver logic of the driver device and communication logic of the peripheral unit; and
- a second circuit arrangement configured to upload voltage-coded information of the driver device of the peripheral unit to the driver device of the electronic control unit via the single-wire line during the triggering of the peripheral unit.

13. The device as recited in claim 11, wherein the electronic control unit is an engine control unit.

14. The device as recited in claim 11, wherein the peripheral unit is one of an ignition coil or a fuel injector.

15. The device as recited in claim 12, wherein the peripheral unit is one of an ignition coil or a fuel injector.

16. The device as recited in claim 13, wherein the peripheral unit is one of an ignition coil or a fuel injector.

17. The device as recited in claim 12, wherein the electronic control unit is an engine control unit.

18. The method as recited in claim 1, wherein the information to be uploaded from the peripheral unit to the electronic control unit is implemented as a diagnostic signal for diagnosis of the peripheral unit.

19. The method as recited claim 1, wherein the information to be uploaded from the peripheral unit to the electronic control unit is implemented as an information signal for further control of the peripheral unit.

20. The method as recited in claim 1, wherein the information to be uploaded is coded in such a way that a duration until a signal edge change of voltage represents a characteristic variable of the information.

21. The method as recited in claim 1, wherein the information to be uploaded is coded in such a way that a state or signal edge change within a time slot represents a characteristic variable of the information and is interpreted as a bit.

* * * * *